(12) United States Patent
Sinclair

(10) Patent No.: US 10,919,717 B2
(45) Date of Patent: Feb. 16, 2021

(54) LIFTING DEVICE FOR BLOCKS WITH NON-PARALLEL WALLS

(71) Applicant: James N. Sinclair, Irwin, PA (US)

(72) Inventor: James N. Sinclair, Irwin, PA (US)

( * ) Notice: Subject to any disclaimer, the term of this patent is extended or adjusted under 35 U.S.C. 154(b) by 0 days.

(21) Appl. No.: 16/503,016

(22) Filed: Jul. 3, 2019

(65) Prior Publication Data
US 2020/0189863 A1 Jun. 18, 2020

Related U.S. Application Data

(60) Provisional application No. 62/778,664, filed on Dec. 12, 2018.

(51) Int. Cl.
| | | |
|---|---|---|
| *B65G 7/12* | (2006.01) | |
| *E04G 21/16* | (2006.01) | |
| *B65G 61/00* | (2006.01) | |
| *B66C 1/44* | (2006.01) | |
| *B66C 1/42* | (2006.01) | |

(52) U.S. Cl.
CPC ............. *B65G 61/00* (2013.01); *B65G 7/12* (2013.01); *B66C 1/422* (2013.01); *B66C 1/44* (2013.01); *E04G 21/162* (2013.01)

(58) Field of Classification Search
CPC .......... B66C 1/422; B66C 1/442; B66C 1/54; B66C 1/44; B65G 7/12; B65G 61/00; E04G 21/162
USPC .............................. 294/62, 89, 97, 104, 110.1
See application file for complete search history.

(56) References Cited

U.S. PATENT DOCUMENTS

| 764,281 | A | * | 7/1904 | Duncan | |
|---|---|---|---|---|---|
| 813,060 | A | * | 2/1906 | Rowell | |
| 824,822 | A | * | 7/1906 | Samuelson | |
| 830,840 | A | * | 9/1906 | Kline | |
| 1,495,179 | A | * | 5/1924 | Hoffer | B66C 1/54 294/16 |
| 2,578,072 | A | * | 12/1951 | Kargol | E04G 21/16 294/62 |
| 2,794,669 | A | * | 6/1957 | Schardinger | B66C 1/54 294/97 |
| 4,095,834 | A | * | 6/1978 | Strauss | B66C 1/54 294/97 |
| 4,223,935 | A | * | 9/1980 | Rayner | B25B 7/12 294/16 |
| 4,705,312 | A | * | 11/1987 | Vooge | B65G 7/12 294/62 |
| 5,490,702 | A | * | 2/1996 | Fleming | B66C 1/54 294/62 |
| 6,131,976 | A | * | 10/2000 | Silva | B66C 1/66 294/89 |

(Continued)

*Primary Examiner* — Dean J Kramer
(74) *Attorney, Agent, or Firm* — The Webb Law Firm

(57) ABSTRACT

A device and method for lifting a hollow bodied block includes an elongated body having a top end and a bottom end with a handle attached to the top end. A first arm rigidly extends from the elongated body in a substantially perpendicular direction and is configured to engage an inner surface of the block. A second arm is pivotally attached to the bottom end of the elongated body in a substantially opposite direction to that of the first arm. Upon exerting a lifting force on the handle of the lifter, the second arm rotates relative to the elongated body, forming a desired angle with the first arm and creating an outward force sufficient to grip and lift the block.

9 Claims, 4 Drawing Sheets

(56) References Cited

U.S. PATENT DOCUMENTS 7,588,274 B2 * 9/2009 Worthington ............ B65G 7/12
294/62

* cited by examiner

LIFTING DEVICE FOR BLOCKS WITH NON-PARALLEL WALLS

CROSS REFERENCE TO RELATED APPLICATION

This application claims the benefit of U.S. provisional patent application No. 62/778,664, filed on Dec. 12, 2018, the disclosure of which is hereby incorporated by reference in its entirety.

BACKGROUND OF THE INVENTION

Field of the Invention

The present invention generally relates to a lifting device. More particularly, the present invention relates to a lifting device for bricks with non-parallel walls.

Description of Related Art

In the construction industry, traditional concrete and cinder blocks are commonly used for a wide variety of purposes. These blocks are typically produced with two hollow centers, or cores, to reduce weight or improve insulation while maintaining the strength of the block under compressive forces. The most common nominal size is 16 in×8 in×8 in, which is adjusted to accommodate for ⅜ inch mortar joints. Generally, the cores of a nominal block comprise walls that are parallel to each other, although blocks may be slightly tapered so that the top surface of the block has a greater surface area to accommodate mortar. The average cinder block weighs between thirty and thirty five pounds, complicating the handling and laying of each block for individual builders. Without the use of a tool, the builder must pick up each block manually, wedging his fingers underneath the block to initiate the grip and lifting it with two hands. Accordingly, a variety of tools have been devised to assist the builder in handling blocks.

However, different construction projects call for blocks of varying designs. Depending on the intended application, concrete blocks may stray from the nominal dimensions, and may encompass specific geometrical features as desired. Thus, it is not uncommon to encounter blocks of varying thicknesses, dimensions, and core designs in the construction field. For example, a popular design for blocks used in the construction of structural walls, including building walls, fences, and retaining walls, employs a generally trapezoidal configuration. Such configurations may include front and rear surfaces of the block that are parallel to one another, but with rearwardly converging lateral sidewalls. Oftentimes, the tops and bottoms of such blocks might entail interlocking lips that ensure a seamless fit when the blocks are stacked and mortared. These variations in design features provide more versatility than the nominally designed block, facilitating the construction of walls that are straight, curved, or serpentine while retaining the rigidity and durability of a traditional block.

In spite of the architectural benefits afforded by these variations in cinder block design, problems result by deviating from the nominal design. Due to their unconventional geometry, it is difficult to obtain a sufficient grip. Conventional block lifters grip the block from the outside. However, such lifters are not specifically designed to accommodate for bricks with non-parallel walls and are either inoperable or render the operation unsafe. A further problem exists due to the interlocking features of certain blocks. The existing tools are exclusively designed to lift the blocks, without regard for placing them. This is not an ideal solution because the tool may potentially interfere with the fit. Likewise, the careful and precise placement of such blocks is particularly important for the initial layer, since manual manipulation, and the alternative design, often damages the foundation surface and threatens the long-term viability of the structure. Thus, to ensure a careful and precise placement of the blocks, it is preferable to lift the blocks from above by gripping or pressure fitting the inner walls. This is particularly difficult when the inner walls are non-parallel. Although various block lifters are designed to grip a block from the inside, they are not specifically designed to accommodate for trapezoidal cores. Yet another problem is the detrimental ergonomic effect that lifting blocks can have on a builder due to their heavy nature. Many tools are designed to use two-hands, which loads the weight of the block in the front of the builder and threatens the stability obtained by lifting the block with one hand from the side.

Accordingly, there is a continuing need for a hand tool designed to lift blocks of unconventional designs from their cores, regardless of wall configuration, safely and comfortably with one hand, without interfering with any external or interlocking features of the block.

SUMMARY OF THE INVENTION

One aspect of the present invention is a tool capable of lifting and carrying blocks of unconventional designs by their inner cores comfortably with one hand. Specifically, this embodiment would be configured to lift blocks consisting of non-parallel walls or interlocking external features.

Non-limiting embodiments of the present invention are directed to a device for lifting a hollow bodied block with non-parallel walls. The device includes an elongated body having a top end and a bottom end and a handle affixed to the elongated body. The device further includes a first arm having a first end and a second end, the first arm extending in a first direction from the elongated body, the first arm having a first bracket including a first surface affixed to the second end of the first arm, the first surface configured to engage a first inner wall of a hollow bodied block. The device further includes a second arm having a first end and a second end, the first end pivotally attached to the elongated body at a pivot point and extending away from the elongated body in a second direction, the second arm having a second bracket including a second surface affixed to the second end of the second arm, and the second surface configured to engage a second inner wall of the hollow bodied block.

In some non-limiting embodiments, the first arm defines a first axis extending from the first end of the first arm to the second end of the first arm, and the second arm is configured to pivot to create a use angle formed between the first axis and the second arm.

In some non-limiting embodiments, the use angle is greater than or equal to 5 degrees and less than or equal to 25 degrees when the first surface is engaged with the first inner wall of the hollow bodied block and the second surface is engaged with the second inner wall of the hollow bodied block.

In some non-limiting embodiments, the use angle is greater than or equal to 10 degrees and less than or equal to 15 degrees when the first surface is engaged with the first inner wall of the hollow bodied block and the second surface is engaged with the second inner wall of the hollow bodied block.

In some non-limiting embodiments, the device further includes a stabilizing member. The stabilizing member extends in a third direction and is configured to engage a third inner wall of a hollow bodied block.

In some non-limiting embodiments, a length of the stabilizing member is adjustable along the third direction.

In some non-limiting embodiments, at least one of the first bracket or the second bracket further includes a compressible elastomer pad affixed to at least one of the first surface or the second surface.

Other non-limiting embodiments of the present invention are directed to a method for lifting a hollow bodied block with non-parallel walls using the device. The method includes holding the device by the handle, lowering the device such that the elongated body at least partially enters a core of a hollow bodied block, angling the second arm and arranging the second bracket such that the second surface engages a first inner wall of the core of the hollow bodied block, pressing down on the handle such that the elongated body further enters the core of the hollow bodied block while keeping the second at least one planar surface engaged to the inner wall of the core, lowering the device until the first at least one planar surface of the first bracket engages a second inner wall of the core, and raising the handle with an upwards force until the second arm rotates relative to the elongated body such that it forms a use angle with the first arm thereby creating a sufficient lift to outwards force ratio such that the block is lifted.

In some non-limiting embodiments, the method further includes adjusting a stabilizing member such that it engages a third inner wall of the core after the first bracket engages the second inner wall of the core.

In some non-limiting embodiments, the method further includes using the stabilizing member to lower the block onto a planar substrate wherein a bottom plane of the block is parallel to the plane of a substrate upon contact.

Other non-limiting embodiments of the present invention are directed to a method for lifting a hollow bodied block with non-parallel walls using the device. The method includes holding the device by the handle, lowering the device such that the elongated body at least partially enters a core of a hollow bodied block, angling either the first or second arm and arranging the corresponding bracket such that the at least one planar surface engages a first inner wall of the core of the hollow bodied block, pressing down on the handle such that the elongated body further enters the core of the hollow bodied block while keeping the at least one planar surface engaged to a second inner wall of the core, lowering the device until the at least one planar surface of the bracket on the disengaged arm engages a second inner wall of the core, and raising the handle until the block is lifted.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

DESCRIPTION OF THE INVENTION

Figure 1:
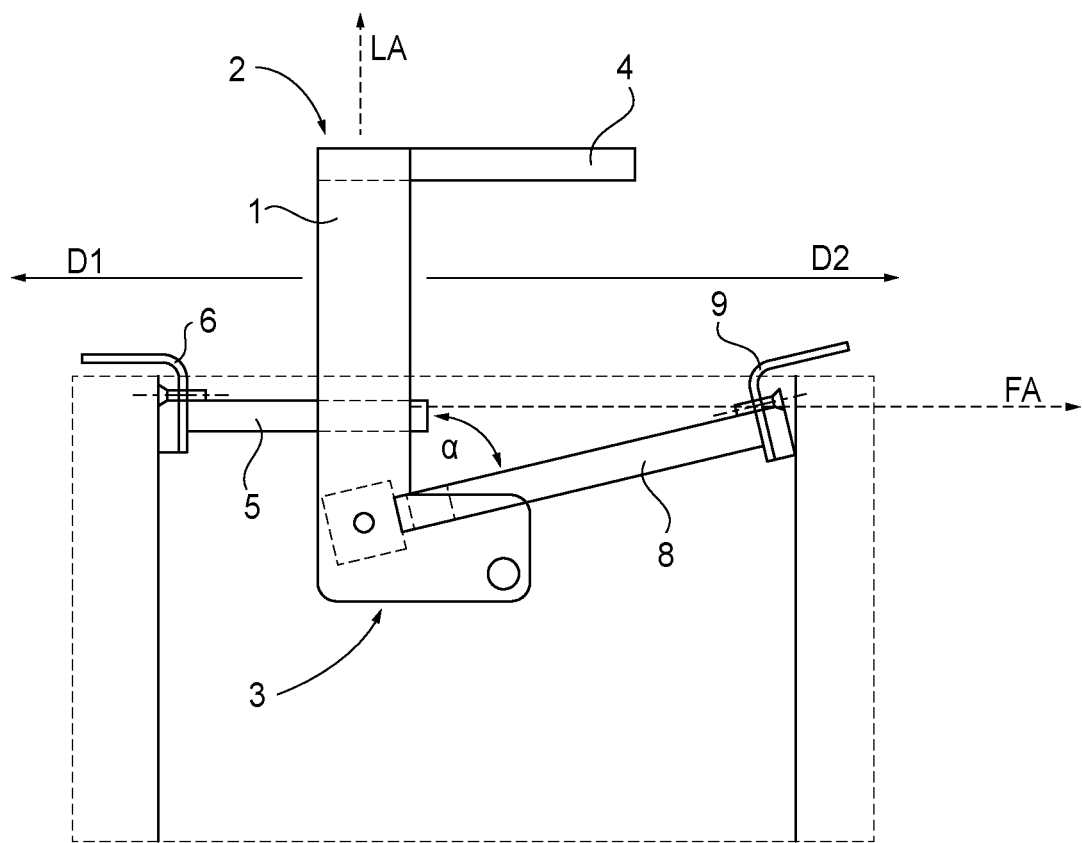
FIG. 1 is a side view of a lifting device to engage within a core of a block with non-parallel walls, according to one embodiment.
Figure 2:
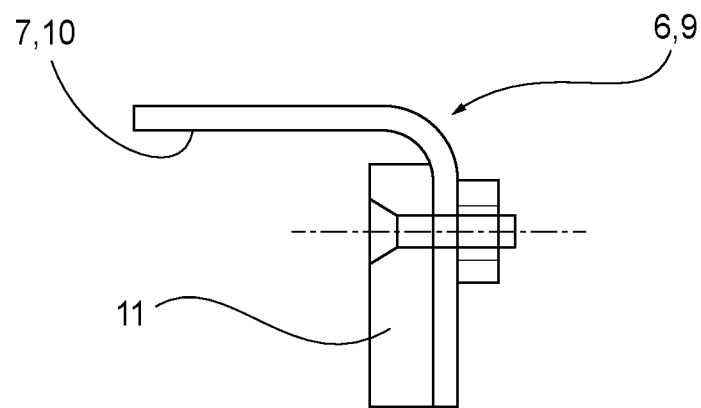
FIG. 2 is a side view of a pad and stop of the lifting device of FIG. 1.

The following description is provided to enable those skilled in the art to make and use the described aspects contemplated for carrying out the invention. Various modifications, equivalents, variations and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Referring to FIGS. 1-8, a device for lifting a hollow bodied block with non-parallel walls, includes an elongated body 1, a handle 4, a first arm 5, and a second arm 8. The elongated body 1 has a top end 2, and a bottom end 3. In certain non-limiting embodiments, the elongated body 1 may be formed by a first and second side member. Each of the first and second side members may be formed as plates, as depicted in FIGS. 1-8. In such an embodiment, each plate includes a planar surface area that is substantially larger than a respective thickness of the plates. Nonetheless, the thickness of said plates must be substantial enough to establish sufficient rigidity to sustain the weight of the blocks. In the embodiment depicted, the planar surface areas of each of the side members face one another, and are rigidly joined by certain mechanical features to form the singular elongated body 1. In certain embodiments, these mechanical features may include the first arm itself, or the pivot block by which the second arm is pivotally attached to the elongated body. Alternatively, a pivot block may be located elsewhere on the elongated body as desired for a specific block or application.

Figure 4:
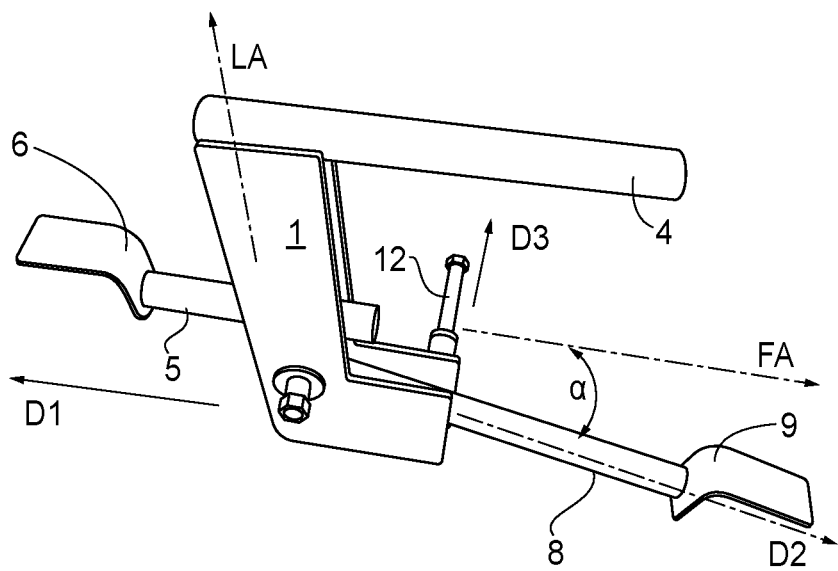
FIG. 4 is a top perspective view of the lifting device of FIG. 3.
Figure 5:
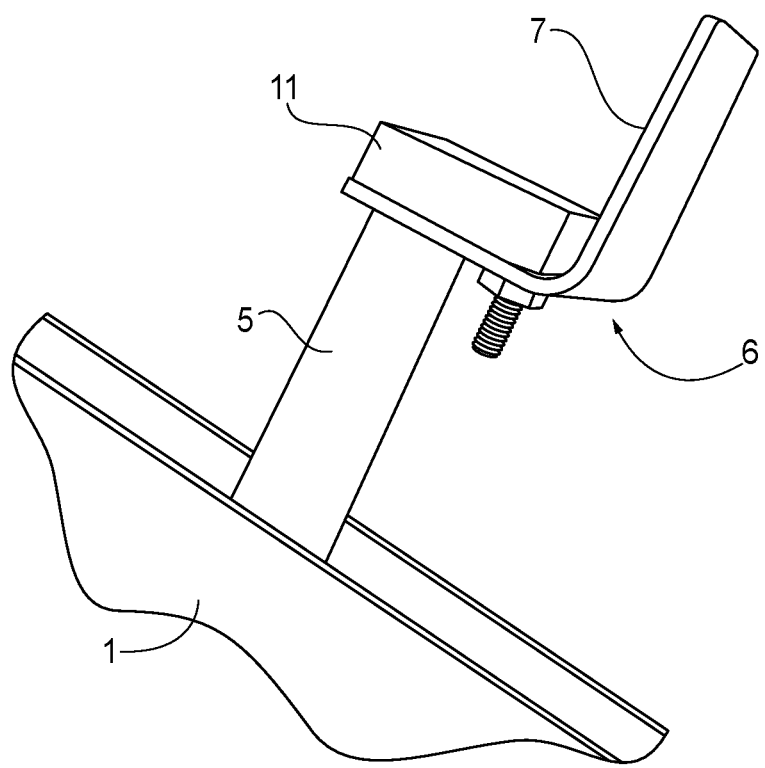
FIG. 5 is a detailed view of a first or second bracket of the lifting device of FIG. 3.
Figure 7:
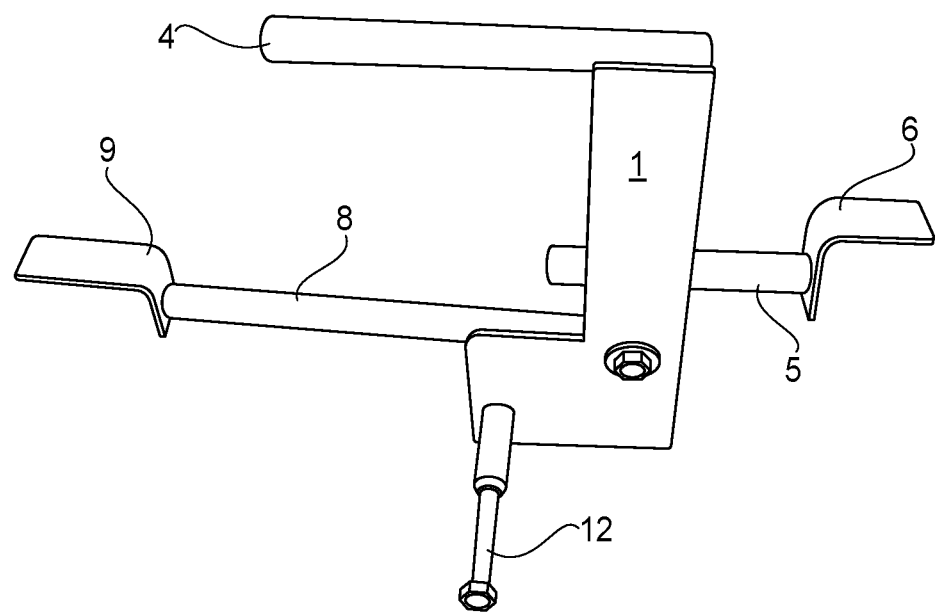
FIG. 7 is a side perspective view of the lifting device of FIG. 3.
Figure 8:
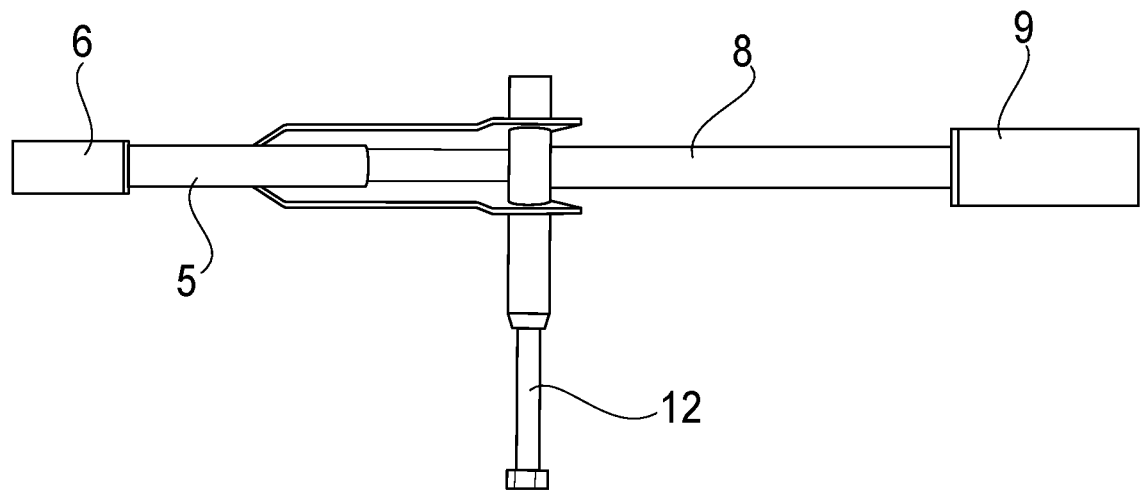
FIG. 8 is a top view of the lifting device of FIG. 3.

The handle 4 is affixed to the top end 2 of the elongated body 1, although other suitable locations along the elongated body 1 are possible. As depicted in FIGS. 4 and 7, the handle 4 may be immovably affixed to the elongated body 1. In the embodiment depicted, the handle 4 is welded to ensure a permanent attachment to the elongated body 1, although other suitable means of connection are considered. However, in an alternative non-limiting embodiment, the handle 4 may be adjustably fixed and lockable to the elongated body 1 to enable motion according to the user's preference and thereby enhance the ergonomic benefits of the lifting device.

Figure 3:
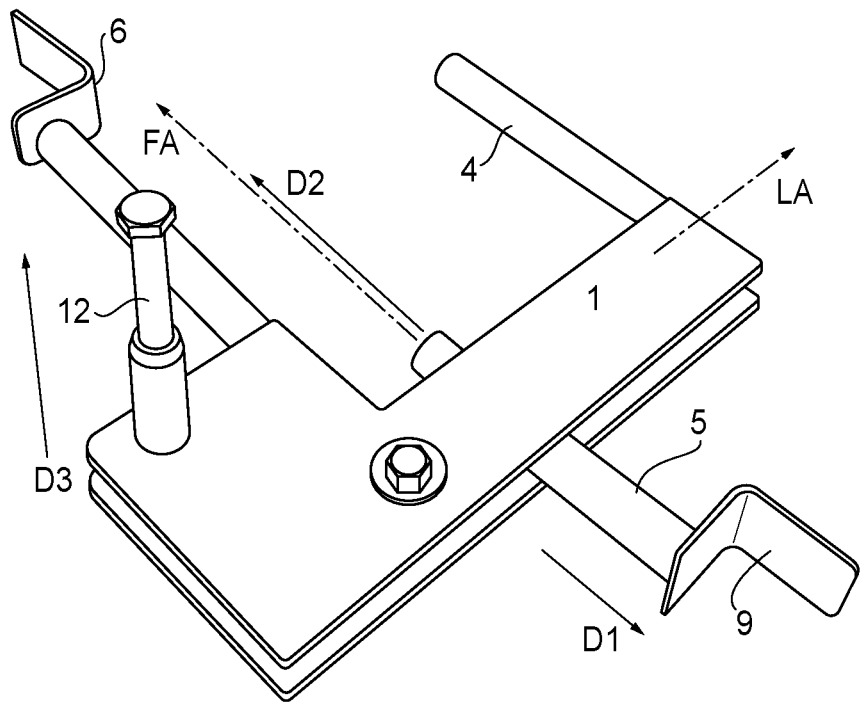
FIG. 3 is a side perspective view of the lifting device shown in FIG. 1.

Referring to FIGS. 3 and 4, the first arm 5 has a first end and a second end. As shown, the first end may rigidly extend in a first direction D1, substantially perpendicular to the longitudinal axis LA of the elongated body 1. The direction in which the first arm 5 extends defines a first axis FA by which a rotation of the pivotally attached second arm 8 is measured. In one non-limiting embodiment, the first end of the first arm 5 may be welded to the elongated body 1. However, the first arm 5 may be alternately attached to the elongated body 1, including but not limited to the use of screws, bolts, or adhesive. Similarly, the first arm 5 may be formed from the same block of material as the elongated body 1. The form of the first arm 5 may vary depending on the desired use and design of the block, and may be cylindrical, rectangular, hollow bodied, or solid. Although the first arm 5 may be rigidly connected to the elongated body 1, as depicted in FIGS. 3 and 4, one skilled in the art will recognize the benefit of another non-limiting embodiment of the present invention, in which the first arm 5 is adjustable in the perpendicular direction from which it extends. Additionally, the first arm 5 may be one of a set of interchangeable arms varying in length, shape, and size, each configured to lift blocks of specific design with the same device. In FIGS. 3 and 4, the first arm 5 rigidly extends from the elongated body 1 at a location between the top end and the bottom end of the elongated body 1, which in some non-limiting embodiments may be adjustable and lockable to ensure an improved fit for blocks with cores of varying dimensions.

FIG. 4 depicts the second arm 8 having a first end and a second end, wherein the first end is pivotally attached to the bottom end 3 of the elongated body 1 at a pivot point. In the non-limiting embodiment of FIG. 4, the pivot point is a pivot block that adjoins the first end of the second arm 8 to the bottom end of the elongated body 1 while enabling the second arm 8 to rotate around the pivot point, relative to the elongated body 1 and the first axis FA. Other locations and mechanisms may be chosen for the pivot point depending on the design of the block and desired use. The second arm 8 is configured such that when both the first bracket 6 and second bracket 9 have engaged the inner walls of a hollow bodied block when the device is in use, a use angle α is established between the second arm 8 and first axis FA. When a lifting force is applied to the handle 4, a resulting outward force is created through the first arm 5 and second arm 8, extending in a direction perpendicular to the lifting force and increasing as the arms become increasingly parallel. The use angle α is configured to encompass a range greater than or equal to five degrees and less than or equal to twenty five degrees, such that the lift to outward force ratio is optimized, and the lifting device obtains a sufficient grip on the inner walls of a block. Ideally, the use angle α will be greater than or equal to ten degrees and less than or equal to fifteen degrees.

In FIGS. 3 and 4, the second arm 8 extends away from the elongated body 1 in a second direction D2 substantially opposite the direction of the first arm 5, and rotates such that the second bracket 9, which is affixed to the second end of the second arm 8 moves such that its relative vertical position to the first bracket 6 varies accordingly. The term substantially opposite is intended to encompass any radial direction measured from the point at which the first arm 5 is attached to the elongated body 1 that is greater than about ninety degrees but less than about two hundred and seventy degrees from the first axis. Although the second arm 8 may be rigidly connected to the elongated body 1, as depicted in FIGS. 3 and 4, in another non-limiting embodiment of the present invention, the second arm 8 is adjustable in a perpendicular direction from which it extends. Additionally, the second arm 8 may be one of a set of interchangeable arms varying in length, shape and size, each configured to lift blocks of specific design with the same device Features that may be included in the first bracket 6 and second bracket 9 are depicted in detail in FIGS. 2 and 5, where at least one surface is affixed to the second end of the first arm 5 and the second end of the second arm 8, respectively. As depicted, the surface may be planar, although alternative configurations are contemplated including, but not limited to, various textured and non-planar surfaces to optimize friction and optimize grip. In the non-limiting embodiment depicted, the brackets 6, 9 are welded to the second end of the first arm 5 and second arm 8 and comprise two planar surfaces which are configured perpendicular to one another. However, alternative configurations are possible depending on the application. In the embodiment depicted, each planar surface is outfitted with a compressible pad 11 with a friction enhancing surface, capable of ensuring a secure grip of an inner wall of a hollow brick core even where the plane of the inner wall's surface is not parallel to the friction enhancing surface. Non-depicted embodiments of the first bracket 6 and second bracket 9 include a ball and socket joint, or other pivotal and lockable mechanisms, from which a planar surface of the first bracket 6 can be adjusted and locked to better align the surface with an inner wall of a non-parallel walled core of a hollow block.

Figure 6:
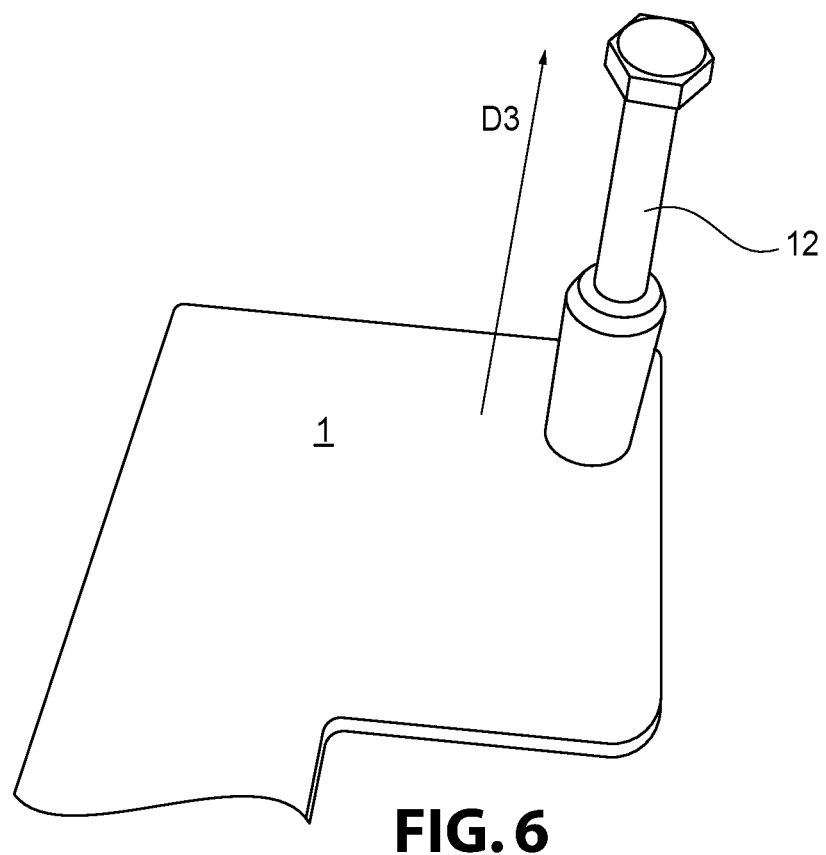
FIG. 6 is a detailed view of a stabilizing member of the lifting device of FIG. 3.

Referring to FIG. 6, depicting another non-limiting embodiment, a stabilizing member 12 extends from the elongated body 1 in a third direction D3. The third direction D3, as depicted, may extend perpendicular to a plane created by the first arm 5 and second arm 8. The stabilizing member 12 may be adjustable and configured to engage an inner wall of a hollow bodied block. The stabilizing member 12 is configured to ensure a correct installation of the lifting device into the core of the block, and to align the center of gravity of the block with that of the handle 4. The stabilizing member 12 provides both an ergonomic utility to the user of the device, as well as a practical utility of ensuring the block is placed down in a particularly level manner. The particular utility of this feature is suitable in constructing a wall on a solid foundation such as limestone, where the extent to which the bottom layer of blocks is level can affect the structural stability of the wall itself. The risk of instability is heightened when the blocks have non-parallel walls due to the uneven distribution of weight throughout the block and the fewer areas from which the block might be gripped. Without such a stabilization member 12, one side of the block may descend before the others and the risk of having an uneven foundation increases significantly. Although not depicted, the stabilizing member 12 can be configured with a variety of features on the end opposite to that of the elongated body 1 intended to grip an inner wall of the core. Such configurations may include, but are not limited to, a compressible pad 11, as depicted on the first bracket 6 in FIG. 6. The stabilizing member 12 may be configured with a bracket similar to the first bracket 6 and second bracket 9, and may have a ball and socket joint, or other mechanism to ensure a secure engagement with a non-parallel wall.

The device depicted in FIGS. 1-8 may be utilized to lift a hollow bodied block with non-parallel walls. Typically, the user will hold the device by the handle 4, such that the second arm 8, which is capable of rotating relative to the elongated body 1, is extending in the direction the user is facing, with the hollow bodied block sitting lengthwise on either the left or right side of the user depending on which hand is holding the device. Alternatively, the user may position the block such that it runs lengthwise in front of the user. In this configuration, the user may hold the handle 4 with two hands, and perform the steps outlined herein, thus providing more strength and stability to the operation.

When the user holds the device by the handle 4 and the second arm 8 extends in the direction the user is facing, the user bends at the knees, at an angle approximately ninety degrees. The device is subsequently lowered such that the elongated body 1 at least partially enters a core of a hollow bodied block. Once the elongated body 1 is at least partially within the core, the second arm 8 is angled downwards towards the ground, pallet, truck bed, or any other surface upon which the blocks may be seated, until a planar surface of the second bracket 9 engages an inner, non-parallel wall of the core of the hollow bodied block. In the non-limiting embodiment depicted in FIGS. 1-8, a second planar surface of the second bracket 9 may additionally be arranged to engage the upper surface of the hollow bodied block for a more secure fit.

After arranging the at least one planar surface of the second bracket 9, the user further presses down on the handle such that the elongated body 1 continues to enter the core of the hollow bodied block. While the elongated body 1 continues to enter the core, the user ensures that at least one planar surface of the second bracket 9 remains engaged with the inner wall of the core. This is enabled by an upwards rotational motion of the second arm 8 relative to the elongated body 1, caused by the lowering of the elongated body 1 itself. Having ensured that the second bracket 9 remains properly engaged, the user continues lowering the device until at least one planar surface of the first bracket 6 engages a second non-parallel inner wall of the core. As with the second bracket 9, in the depicted embodiment a second planar surface of the first bracket 6 may be additionally arranged to engage the upper surface of the hollow bodied block for a more secure fit. Once the first bracket 6 is properly engaged with the second inner surface of the core, the user begins lifting the handle 4 such that the elongated body 1 begins to rise out of the core. The raising of the elongated body 1 causes the second arm 8 to begin rotating downward relative to the elongated body 1, thereby creating a gravitational pressure fit and securing both the first bracket 6 and second bracket 9 to the inner walls of the core. Thus, by standing up, the user is able to lift the hollow bodied block along with the device, and move the block to a desired location.

The block may similarly be lifted by repeating the aforementioned steps, but engaging the first surface 7 of the first arm 5 to an inner wall of the core first, and subsequently engaging the second surface 10 of the second arm 8. In a preferred embodiment of the present disclosure, both the first bracket 6 and second bracket 9 are engaged with to the core prior to lifting, regardless of the sequence in which either bracket is engaged.

In another non-limiting embodiment, further comprising a stabilizing member 12, the user may also adjust the stabilizing member 12 such that it engages a third inner wall of the core. Although this step can occur at any point of the process, it is ideally performed after the first bracket 6 engages the second inner wall of the core. In this embodiment, the user may lower the block onto a planar substrate wherein a bottom plane of the block is completely parallel to the plane of the foundation upon which the block is being installed. Thus, the stabilizing member 12 assists the user by altering the center of gravity, ensuring that all points on the bottom plane of the block contact are parallel to the plane of the foundation. Upon lowering the block, the user may disengage the stabilizing member 12 and remove the lifting device from the block.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A device for lifting a hollow bodied block with non-parallel walls, comprising:
    an elongated body having a top end and a bottom end;
    a handle, affixed to the elongated body;
    a first arm having a first end and a second end, the first arm rigidly mounted to and extending in a first direction from the elongated body, the first arm having a first bracket comprising a first surface affixed to the second end of the first arm, the first surface configured to engage a first inner wall of a hollow bodied block;
    a second arm having a first end and a second end, the first end pivotally attached to the elongated body at a pivot point and extending away from the elongated body in a second direction, the second arm having a second bracket comprising a second surface affixed to the second end of the second arm, and the second surface configured to engage a second inner wall of the hollow bodied block by angling the second surface; and
    a stabilizing member extending in a third direction, the stabilizing member configured to engage a third inner wall of a hollow bodied block,
    wherein a length of the stabilizing member is adjustable along the third direction.

2. The device of claim 1, wherein the first arm defines a first axis extending from the first end of the first arm to the second end of the first arm, and the second arm is configured to pivot to create a use angle formed between the first axis and the second arm.

3. The device of claim 2, wherein the use angle is greater than or equal to 5 degrees and less than or equal to 25 degrees, when the first surface is engaged with the first inner wall of the hollow bodied block and the second surface is engaged with the second inner wall of the hollow bodied block.

4. The device of claim 2, wherein the use angle is greater than or equal to 10 degrees and less than or equal to 15 degrees, when the first surface is engaged with the first inner wall of the hollow bodied block and the second surface is engaged with the second inner wall of the hollow bodied block.

5. The device of claim 1, wherein at least one of the first bracket or the second bracket further comprises a compressible elastomer pad affixed to at least one of the first surface or the second surface.

6. A method for lifting a hollow bodied block with non-parallel walls, using the device of claim 1, comprising:
holding the device by the handle;
lowering the device such that the elongated body at least partially enters a core of a hollow bodied block;
angling the second arm and arranging the second bracket such that the second surface engages a first inner wall of the core of the hollow bodied block;
pressing down on the handle such that the elongated body further enters the core of the hollow bodied block, while keeping the second surface engaged to the first inner wall of the core;
lowering the device until the first surface of the first bracket engages a second inner wall of the core; and
raising the handle with an upwards force until the second arm rotates relative to the elongated body such that it forms a use angle with the first arm, creating a sufficient lift to outwards force ratio such that the block is lifted.

7. The method according to claim 6, further comprising adjusting a stabilizing member such that it engages a third inner wall of the core after the first bracket engages the second inner wall of the core.

8. The method according to claim 7, further comprising using the stabilizing member to lower the block onto a planar substrate wherein a bottom plane of the block is parallel to the plane of a substrate upon contact.

9. A method for lifting a hollow bodied block with non-parallel walls, using the device of claim 1, comprising:
holding the device by the handle;
lowering the device such that the elongated body at least partially enters a core of a hollow bodied block;
angling either the first or second arm and arranging the corresponding bracket such one of the first surface or the second surface engages a first inner wall of the core of the hollow bodied block;
pressing down on the handle such that the elongated body further enters the core of the hollow bodied block while keeping one of the first surface or the second surface engaged to a second inner wall of the core;
lowering the device until the first surface or the second surface of the bracket on the disengaged arm engages a second inner wall of the core; and
raising the handle until the block is lifted.

* * * * *

UNITED STATES PATENT AND TRADEMARK OFFICE
CERTIFICATE OF CORRECTION

PATENT NO. : 10,919,717 B2
APPLICATION NO. : 16/503016
DATED : February 16, 2021
INVENTOR(S) : James N. Sinclair Page 1 of 1

It is certified that error appears in the above-identified patent and that said Letters Patent is hereby corrected as shown below:

In the Claims

Column 10, Line 13, Claim 9, after "such" insert -- that --

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*